Nov. 28, 1939.  C. E. IVES  2,181,185
AUTOMATIC CUTTING DEVICE
Filed Sept. 14, 1936   11 Sheets-Sheet 2

Inventor:
Clifford E. Ives.
By: Lee J. Gary
Attorney

Nov. 28, 1939. C. E. IVES 2,181,185
AUTOMATIC CUTTING DEVICE
Filed Sept. 14, 1936 11 Sheets-Sheet 8

Inventor:
Clifford E. Ives,
By: Lee J. Gary
Attorney.

Nov. 28, 1939.　　　　C. E. IVES　　　　2,181,185

AUTOMATIC CUTTING DEVICE

Filed Sept. 14, 1936　　　11 Sheets-Sheet 9

Inventor:
Clifford E. Ives,
By: Lee J. Gary
Attorney

Nov. 28, 1939.                    C. E. IVES                    2,181,185
                           AUTOMATIC CUTTING DEVICE
                   Filed Sept. 14, 1936          11 Sheets-Sheet 10

Inventor:
Clifford E. Ives,
By: Lee J. Gary.
Attorney.

Patented Nov. 28, 1939

2,181,185

UNITED STATES PATENT OFFICE 2,181,185

AUTOMATIC CUTTING DEVICE

Clifford E. Ives, Wilmette, Ill., assignor to Ritchey E. Landis, Chicago, Ill.

Application September 14, 1936, Serial No. 100,599

12 Claims. (Cl. 90—33)

This invention relates to improvements in an automatically operated machine, and refers specifically to a machine wherein semi-processed or semi-prepared material is automatically fed, operated upon and automatically discharged as a finished product from the machine.

In substantially all phases of the printing art and particularly in specialty printing such as in the printing of advertisements, circulars, calendars, pamphlets, accounting forms, etc., ruled lines either plain or ornamental such as dotted or dashed lines, are frequently used, particularly for borders and division lines. The provision of these lines in the finished print, of course, required that impression strips of various thicknesses with continuous or dotted impression surfaces be used in conjunction with the set-up type. These strips are usually made of lead or a lead alloy similar to the constitution of the usual printing type and must be so finished as to height and the impression surfaces thereof must be such as to result in the printing of clearly defined, fully inked border lines, division lines, etc.

Although the formation of the type by linotype, monotype or the like is performed by and recognized as a phase of the printing art, the manufacture of strips for printing borders, division lines and the like, through very closely allied to the printing art has acquired a distinct status and comprises an industry of its own. Printing concerns usually purchase more or less standardized strips from manufacturers of strips and use said strips as their needs dictate. Said strips are usually merchandised in predetermined lengths and the printer cuts said strips to lengths conforming to his own requirements.

As hereinbefore pointed out said strips are constructed of lead or a lead alloy and are initially formed by moulding, extruding or by like processes. However, the strips as taken from the molds or extruding devices frequently possess defects which render them unsuitable for certain classes of work. The dimensions of said strips particularly as to height (the strips in use being set on edge must necessarily conform in height with the impression surfaces of the type with which they are used) are critical and the impression surfaces of said strips must be smooth to uniformly spread the ink during printing. Moreover, dashed or dotted lines may be desired which require further operations after molding or extruding. Moreover, strips of each given dimension if used immediately after molding or extruding requires a separate mold which consequently necessitates a mold for each different size strip and each different faced strip. Therefore, to produce a wide variety of strips requires a large investment in molds which, of course, raises the cost of the strips.

To overcome this difficulty it has heretofore been the practice of some strip manufacturers to plane or mill the strips to desired finish, surface and dimension thereby eliminating the expense of so great a variety of molds and simultaneously securing a more desirable product. This, however, has been a hand operation and is consequently slow and requires that a skilled worker be employed. Hence, production is decreased and the cost of the strips are raised due to the excessive labor cost.

As a feature of my invention strips or rules, as said strips are sometimes called, may be planed or finished as a completely automatic operation, the machine being charged with a plurality of said strips as the same come from the molds or extruding device, the charged strips being automatically fed in seriatim to an operating zone wherein they are automatically aligned and held during the planing or finishing operation, the movement of the machine in feeding a fresh strip to the operating zone simultaneously acting to remove the finished strip from the operating zone.

The machine comprising my invention, although particularly adaptable for the planing and finishing of lead or lead alloy strips may also be used to plane or finish strips constructed of other materials and used for other purposes such as brass strips, "Bakelite" strips, wood strips or the like.

Other objects and advantages of my invention will be apparent from the accompanying drawings and following detail description.

In the drawings.

Fig. 15 is a sectional view taken on line 15—15 of Fig. 16.

Figure 1:
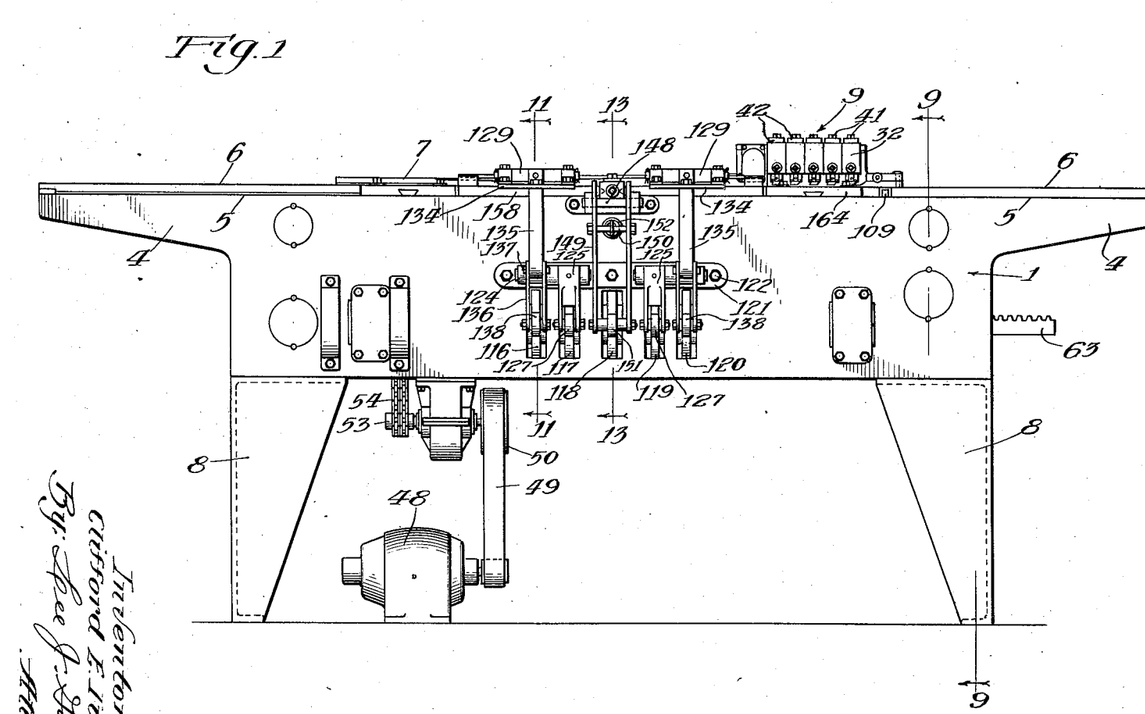
Fig. 1 is a side elevational view of my planing or finishing machine.
Figure 2:
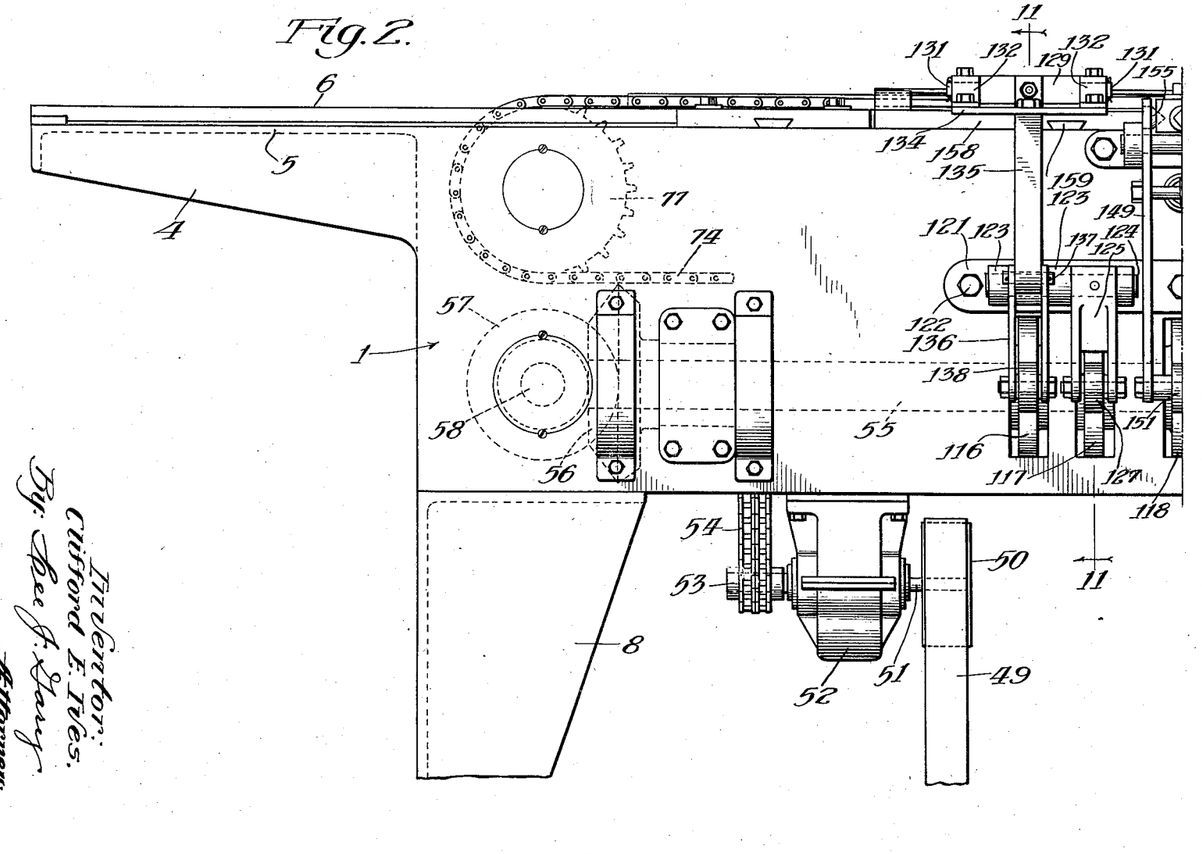
Fig. 2 is an enlarged side elevational view of a portion of the machine shown in Fig. 1.
Figure 3:
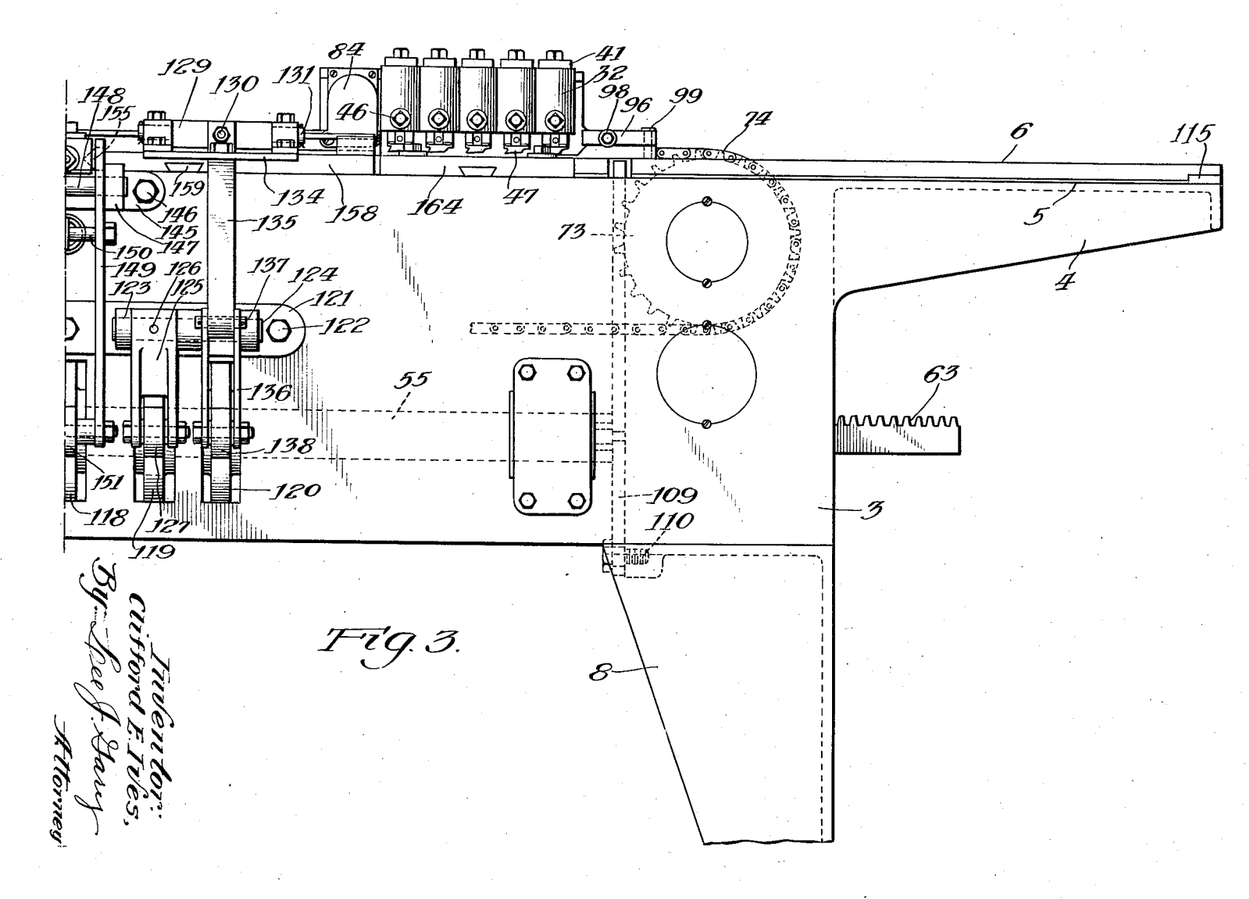
Fig. 3 is a continuation of Fig. 2.
Figures 9, 10:
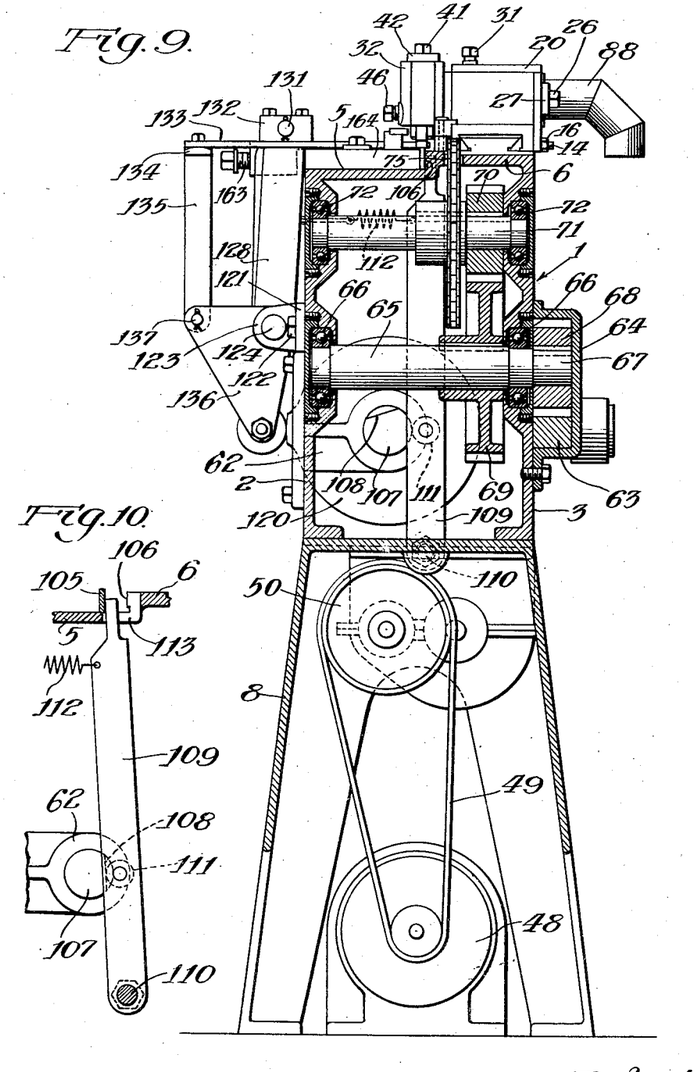
Fig. 9 is a sectional view taken on line 9—9 of Fig. 1.
Fig. 10 is a fragmentary, sectional view taken on line 10—10 of Fig. 8 illustrating the mechanism for laterally displacing the finished work discharged from the operating zone.
Figure 11:
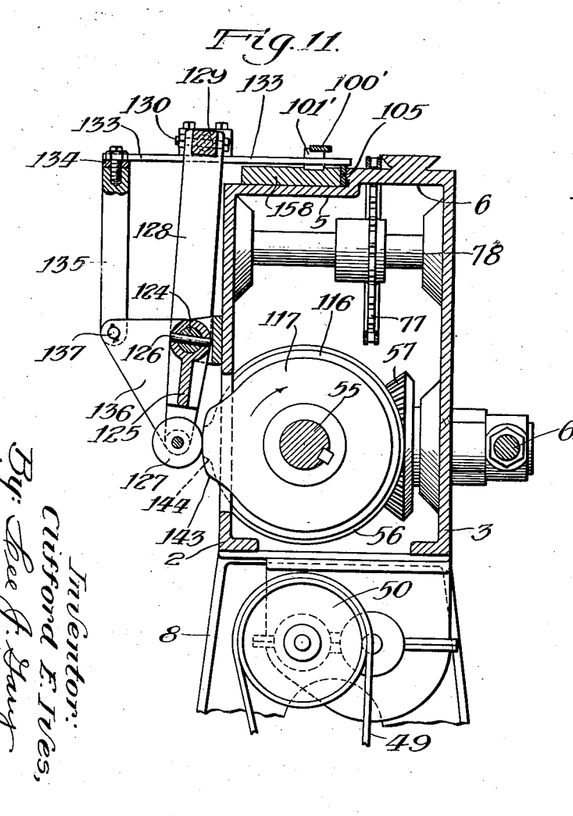
Fig. 11 is a sectional view taken on line 11—11 of Fig. 1.
Figure 12:
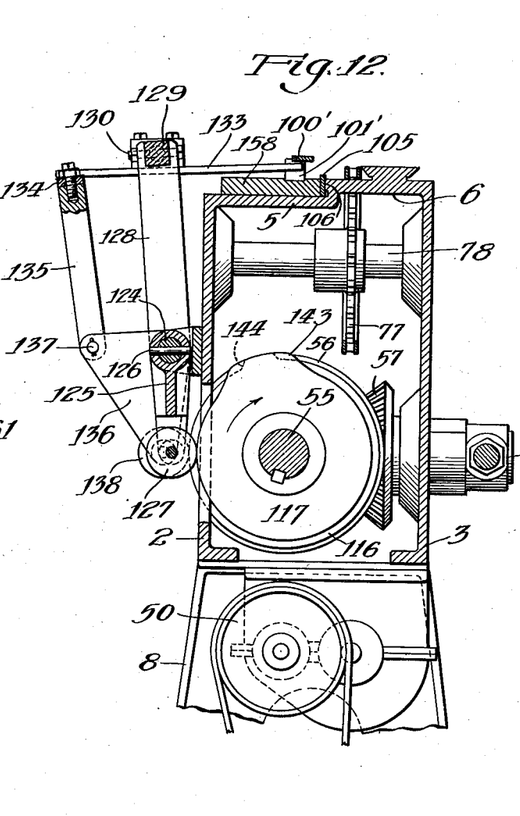
Fig. 12 is a similar view illustrating the cam operated mechanism shown in Fig. 11 at a different portion of its cycle.

Referring in detail to the drawings, with particular reference to Figs. 1 and 9, 1 indicates a frame which may be of substantially rectangular cross-section and may have a front side 2, a rear side 3 and end extensions 4.

The frame 1 may be provided with a top which may be formed integral with the sides 2 and 3, said top being divided longitudinally into substantially two equal areas, the front portion 5 of the top being at a lower level or in a lower plane than the rear portion 6. A rail 7 may be carried upon the rear portion 6 of the top and may be formed integral with said top, said rail being of dove-tail section and extending longitudinally upon the top 6 a substantial distance on each side of the center of the frame. The frame 1 may be carried at each of its ends by legs or supports 8. As will be hereinafter more fully described, the frame 1 carries the instrumentalities and operating devices comprising my invention, one of which devices comprises a movable carriage 9 which is slidably mounted upon rail 7.

Referring particularly to Figs. 15, 16, 17 and 18, the various parts comprising the movable carriage 9 are shown in detail. The carriage 9 comprises essentially a body which is designated generally by the reference numeral 10. The lower portion of the body 10 is co-extensive in length with the carriage 9 and is provided with a recess 11 which opens toward the bottom face of the body. The recess 11 is adapted to cooperate with the dove-tail sectioned rail 7 and one side wall of said recess is inclined, as shown at 12 in Fig. 16, at an angle which conforms with one overhanging tapered side of rail 7. The opposite side wall of recess 11 is square or vertical and said body is provided with a plurality of openings or bore holes 13 which are internally threaded to receive set screws 14. A bar 15 is adapted to be positioned adjacent one inclined face of rail 7, the opposite side of said bar bearing upon the ends of the set screws 14.

As can readily be seen the body 10 can be mounted upon the top 6 and the arrangement is such that said body is slidable upon the rail 7. By the provision of the adjustable bar 15 the body 10 may be maintained in substantially fixed relationship with the rail 7 in so far as lateral movement or movement in a vertical direction is concerned. Moreover, by suitably adjusting the position of bar 15, body 10 may be permitted to slidably move along rail 7 and said body will have a minimum amount of play in a lateral or vertical direction. When the desired adjustment has been secured, screws 14 may be locked by means of lock nuts 16. As will be hereinafter more fully appreciated, the elimination of substantially all lateral or vertical play of the body 10 upon rail 7 is conducive of more accurate operation of the instrumentalities carried by said body.

Formed integral with the lower portion of the body 10 is a plurality of spaced walls 17 which extend upwardly from the rail-engaging portion of the body. A plate 18 may be mounted upon the rear edges of said extension or partitions 17, said plate being secured to said partitions by means of machine screws or the like 19. In like manner a top plate 20 may be secured to the upper edges of said partitions and may be secured thereto by means of screws 21.

As can readily be seen, compartments 22 are provided between adjacent plates 17, which open toward the front side of the carriage. The compartments 22 are adapted to receive plates 23 which in turn, as will be hereinafter more fully described, carry the operating tools. The rear end of each of the plates may be provided with threaded taps 24 into which the threaded ends of screws 25 may be insertable, the shanks of said screws projecting through the rear wall or plate 18 and carrying at their heads nuts 26. Circular disks 27 may be formed integral with the nuts 26 and may be provided with scales 28 whereby the degree of angular rotation of screws 25 may be ascertained. As can readily be seen, by rotating nuts 26, plates 23 may be caused to slide inwardly or outwardly within compartments 22 and the slidable movements of said plates may be ascertained in terms of the degree of angular rotation of nuts 26 as read from the scales 28. Coil springs 29 may be confined between the inner face of the wall 18 and the ends of plates 23, said springs being conducive to positive movement of plates 23 and also to the elimination of errors in the reading of scales 28 due to the play of the screw threads. The upper plate 20 may be apertured adjacent each of the compartments 22, said apertures being adapted to receive set screws 30 having polygonal heads 31. As is apparent, when the desired position of plates 23 within compartments 22 is obtained by manipulation of screws 25, said plates may be fixed in said position by means of the set screws 30.

A housing 32 may be formed integral with each of the outer ends of plates 23, each of which is provided with a circular bore 33 which open toward the bottom of the housings. A tool carrying member 34 is adapted to be slidably positioned within each of the bores 33 and comprises, when planing operations are to be performed by the machine, a pair of segmental cylindrical portions 35 and 36. Included between each pair of segments 35 and 36 is a cutting or planing knife 37 which may be removably secured to said segments by means of pins 38 and 39, said pins being adapted to be driven through said segments and through the shank of the planing knife. The upper portion of said segments may be threaded to receive the threaded end of an adjusting screw 40, the shank of which projects through the upper end wall of the housings and terminates in a polygon shaped nut 41. Formed as an integral portion of each of said nuts is a disk 42 which may be provided with a scale 43 for determining the degree of angular movement of each screw 40. Each of the segments 36 of the tool holding member 34 is provided with a longitudinally disposed slot 44 and each of the housings 32 is apertured adjacent the position of said slot to receive a set screw 45 which has a polygonal shaped head 46. It can readily be seen that by movement or rotation of each of the nuts 41 each of the tool holding members 34 may be raised or lowered within bores 33 and the degree of movement of said tool holding members may be ascertained from interpolated readings of scale 43. When the desired elevation of each of the tool holding members 34 is obtained, set screws 45 may be manipulated to lock said tool holding members within the bores 33. The ends of the planing knives 37 may project below the segmental cylindrical portions 35 and 36 and may terminate in cutting edges 47.

It is to be understood, of course, that my invention, although particularly adaptable for planing operations, can be used for carrying out other operations merely by substituting different well known types of tools for the cutting knives 37. For instance, if it is desired to produce a rule or strip which is adapted to be used for printing a dotted or dashed line, knurls may be substituted for one or more of the cutting knives 37. In addition, the knives 37 instead of cutting flat or horizontally, may be so constructed as to cut angular or circular grooves in the face of the work over which the knives pass.

Referring particularly to Figs. 1, 6, 7 and 8, the drive mechanism for moving carriage 9 along rail 7 is illustrated. An electric motor or other prime mover 48 may be adapted to drive by means of belt 49 or otherwise a pulley 50 which may be mounted upon shaft 51 of a speed reducing mechanism 52. The output shaft 53 of said speed reducing mechanism may carry a sprocket wheel (not shown) which may drive sprocket chain 54. A shaft 55 may be journalled within the frame 1 and may extend longitudinally within said frame. Shaft 55 may carry a sprocket wheel (not shown) which may be driven by chain 54. A bevel gear 56 may be mounted upon one end of shaft 55 and is adapted to mesh with bevel gear 57 mounted upon shaft 58 which extends transversely through the rear side wall 3 of frame 1. A disk 59, Fig. 4, may be mounted upon the end of shaft 58 and may carry an eccentric pin 60 which is pivotally connected to arm 61. It can readily be seen that as shaft 55 is rotated thereby rotating shaft 58, a reciprocating motion is imparted to arm 61. The opposite end of arm 61 is connected to a crosshead 62 which, in turn, carries a rack 63. Rack 63 is supported and guided by the bracket 64 which is secured to the rear side 3 of frame 1. A shaft 65 is transversely positioned within frame 1 and may be journalled at its ends in ball bearings 66, a portion of said shaft projecting outside of frame 1 as shown best at 67 in Fig. 9. A spur gear 68 may be keyed to the projecting end 67 of shaft 65, said spur gear being adapted to mesh with the teeth of rack 63. It is apparent that as arm 61 is reciprocated, rack 63 will also be reciprocated and in turn will oscillate the pinion 68 thereby oscillating shaft 65. A spur gear 69 may be keyed to shaft 65 within frame 1 and is adapted to mesh with pinion 70 carried upon shaft 71 which may be transversely positioned within frame 1 and journalled in ball bearings 72. A sprocket wheel 73 may be rigidly secured to shaft 71 within frame 1 and may be adapted to drive sprocket chain 74. An opening 75 may be provided in the rear top surface 6 of frame 1 and said sprocket chain 74 is adapted to pass through said opening after said chain is carried over sprocket wheel 73. One end of the chain 74 may be secured to the body portion 10 of carriage 9 as indicated at 76 in Figs. 15 and 17. Sprocket chain 74 may pass around sprocket wheel 77 which may be mounted upon shaft 78 transversely positioned in frame 1 and carried by bearings similar to bearings 72. Shaft 78, however, is positioned at the opposite end of frame 1 from shaft 71. After passing over sprocket wheel 77, chain 74 travels above the surface of the rear top portion of the frame and the end of said chain is secured to the opposite end of carriage 9 as indicated at 79 in Fig. 15. A turnbuckle 80 is interposed in chain 74 and is adapted to maintain said chain in taut condition.

In operation, reciprocating motion of shaft 61 imparts similar motion to rack 63 which, in turn, oscillates gears 68 and 69. This oscillating movement is imparted to gear 70 and, in turn, oscillates sprocket wheel 73. As sprocket wheel 73 oscillates, chain 74 intermittently moves in opposite directions thereby moving carriage 9 in a reciprocating manner over the surface of frame 1. The degree of movement of carriage 9 is, of course, determined by the throw of the eccentric pin 60 and also by the ratio of the gears 68, 69 and 70, and the size of sprocket wheels 77. The speed of movement of the carriage 9 is, of course, determined by the ratio of the speeds of the input and output shafts of the speed reducer 52, the ratio of the sprocket wheels mounted upon shafts 53 and 55, and also the ratio of the bevel gears 56 and 57. In view of the fact that chain 74 does not travel in a sequential or endless path over the sprocket wheels 73 and 77, the turnbuckle 80 may be interposed in said chain and, consequently, said chain may be maintained relatively taut thereby eliminating any lost motion due to change of direction of movement of said chain.

Figures 15, 18:
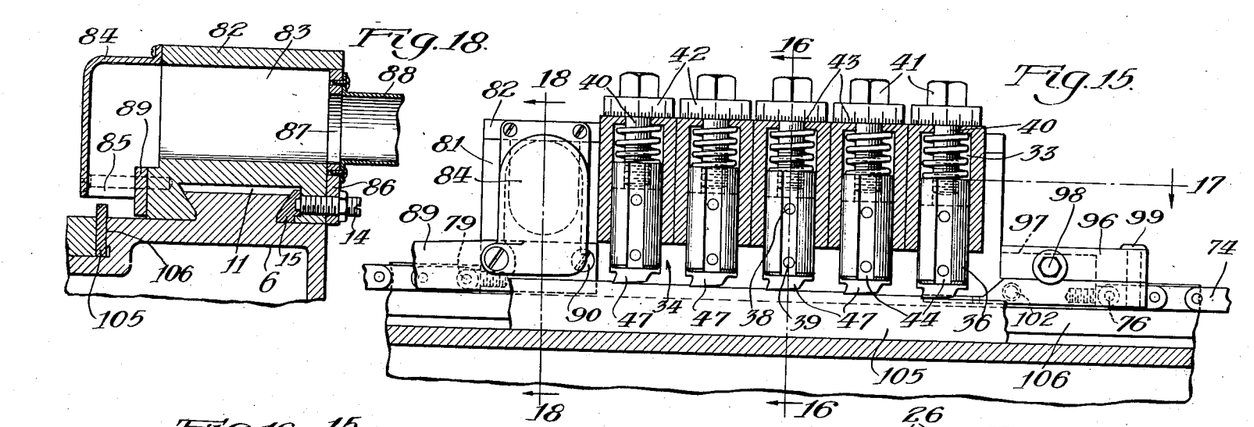
Fig. 15 is a longitudinal sectional view of a portion of the movable carriage illustrating the mounting of the knives or other finishing mechanisms.
Fig. 18 is a transverse sectional view taken on line 18—18 of Fig. 15.
Figure 16:
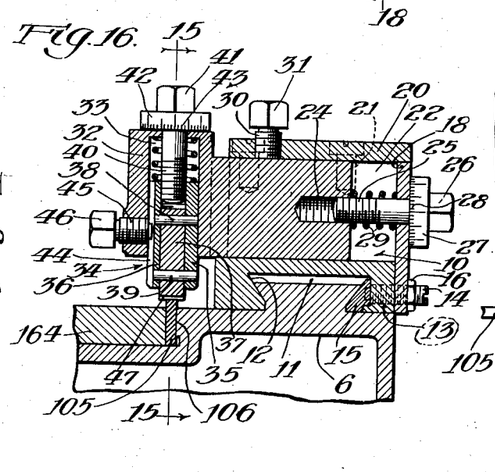
Fig. 16 is a transverse sectional view taken on line 16—16 of Fig. 15.
Figure 17:
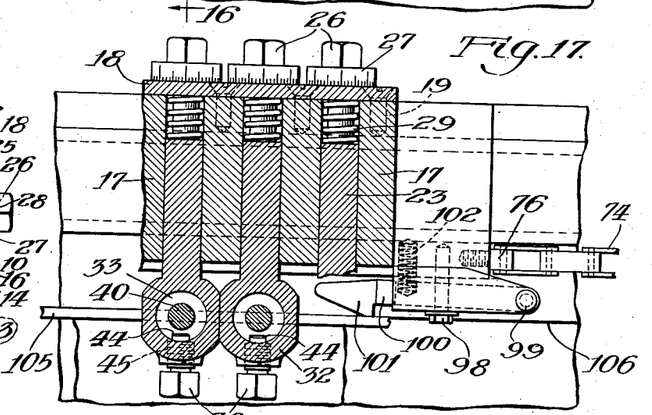
Fig. 17 is a plan sectional view taken on line 17—17 of Fig. 15.

Referring particularly to Figs. 15 and 18, 81 indicates a portion of the body 10 of carriage 9, the member 81 being formed integral with said body and being of U-shape. A plate 82 may be mounted at the upper ends of the legs of the U providing a compartment 83. A hood 84 may be mounted over one end of compartment 83 and may be provided with an opening 85 which is positioned adjacent the path of travel of the knives 47. A closure plate 86 may be mounted at the opposite end of compartment 83, said plate being provided with a central aperture 87 over which is positioned a conduit 88 which communicates with compartment 83. As will be hereinafter more fully described, shavings, cuttings or filings removed by the knives 47 or equivalent tools which may be mounted in the carriage 9, accumulate along the path of travel of said knives or tools. In practice, in order to remove said shavings or cuttings, conduit 88 may be connected to a suitable source of vacuum (not shown) and inasmuch as the compartment 83 is thereby maintained under vacuum, the shavings or cuttings may be drawn upwardly through the openings 85, which, as has been hereinbefore described, is disposed adjacent the path of travel of knives 47.

If desired, the compartment 83, hood 84 and accompanying apparatus for removing the shavings, may be mounted upon the opposite or trailing end of the carriage instead of the leading end as shown. Further, whether positioned at the leading or trailing end of the carriage, air or fluid under superatmospheric pressure may be used instead of vacuum, in which case the shavings and cutting will be blown away from the seat of the cutting operation.

Bar 89 may be mounted at one end as by means of screw 90 to the body 10 of the carriage 9. Said bar may extend outwardly in a direction parallel to the direction of movement of the carriage and may carry at its outermost end a member 91 which may be secured to said bar by screws 92 or the like. The end of the member 91 may be hook-shaped as shown best at 93 in Fig. 4. The member 91 may be constructed of a resilient material and may carry a nut 94 adjacent the hook 93. An adjusting screw 95 may be threadedly positioned through nut 94 and through the member 91, the end of said screw bearing upon the end of the bar 89. As will be hereinafter more fully described, bar 89 and member 91 comprises the mechanism for feeding the work to the operating zone.

Mounted at the opposite end of the bar 89 on the body 10 of carriage 9 is a lug 96, said lug being secured to a rearwardly projecting portion 97 of the body 10 by means of screw 98. A pin 99 may be carried at the end of lug 96 and is adapted to pivotally support member 100. The free end of member 100 may be hook-shaped as indicated at 101 in Fig. 17. A coil spring 102 may be confined at one end within an aperture provided in extension 97, the opposite end of said coil spring being confined within an aperture provided in the member 100, said coil spring acting to urge member 100 in a counter-clockwise direction about the pivot pin 99 as viewed in Fig. 17. The member 100 together with its hook shaped end 101 comprises the means whereby the finished work is removed from the operating zone. This will be hereinafter more fully described.

For the sake of illustrating the operation of my machine, its use as a device for finishing strips or rules to be used in printing will be described. Further, to simplify the description, knives 47 are shown as having square edges which are adapted to merely plane a square surface upon an edge of a roll or strip such as indicated at 103 in Fig. 19, the surface 104 being the planed surface.

Figures 4, 5A:
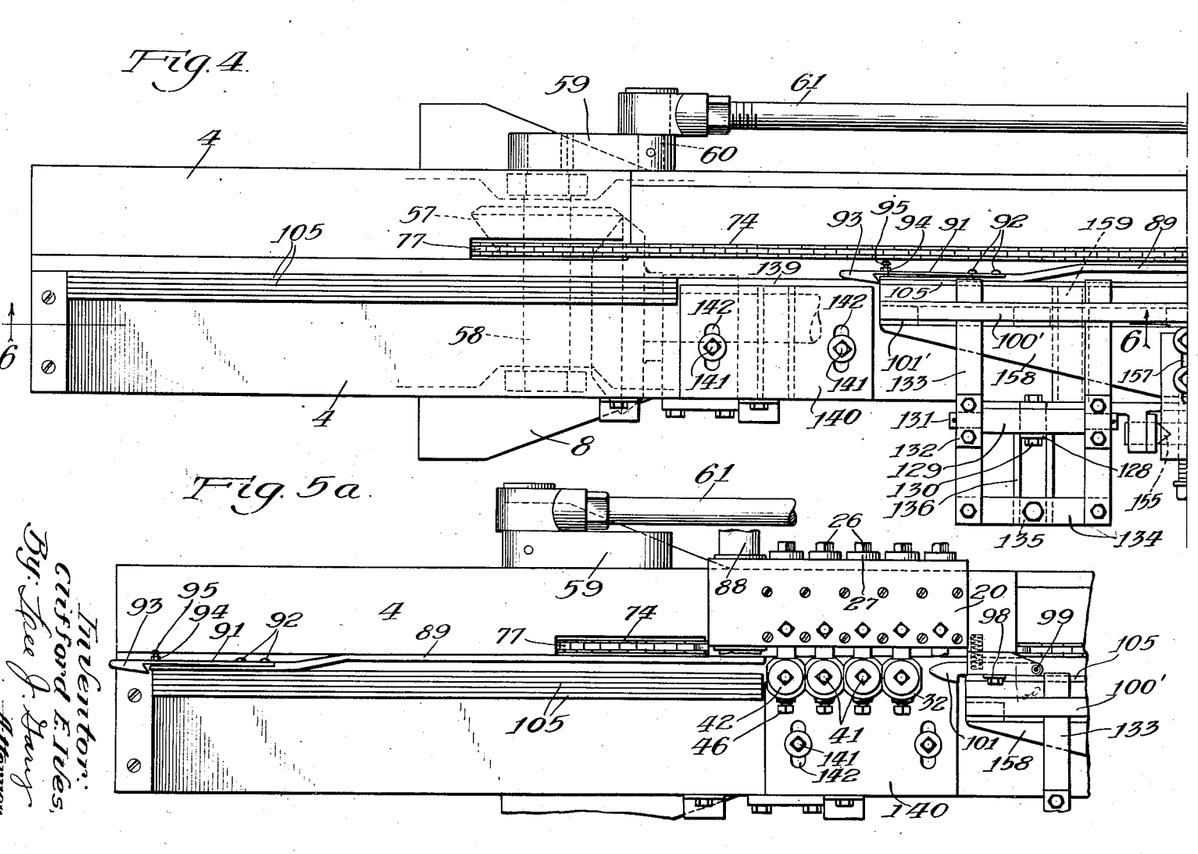
Fig. 4 is a top plan view of a portion of the machine corresponding to that shown in Fig. 2.
Fig. 5a is a fragmentary top plan view of my device illustrating the position of the carriage at the completion of its operative stroke.

The machine may be charged with a plurality of strips 105, Figs. 4 and 5a, as said strips are produced from the molds of the extruding machines. A series of such strips are disposed on edge with their longitudinal axes parallel to the longitudinal axis of the machine, a plurality of said strips being positioned side by side as indicated in Figs. 4 and 5a. Said strips may be positioned upon the lower portion 5 of the top of the machine and the inner-most strip may be disposed adjacent shoulder 106, Fig. 9, formed at the juncture of the top surfaces 5 and 6. When the rod 61 is so reciprocated as to cause the top of chain 74 to move to the left as viewed in Figs. 4 and 5a, carriage 9 will also move toward the left. In so moving, the point of the hook 93 rides over the side of the inner-most strip 105 until carriage 9 arrives at the position shown in Fig. 5a. When the carriage has traveled to this position the hook 93 will spring over the end of the inner-most strip 105 and the point of said hook will be positioned immediately adjacent the center of the end of the strip. If relatively thick strips are adapted to be operated upon, screw 95 may be rotated to permit the hook-shaped member 93 to move a sufficient distance so as to contact the center of the end of the strip. If narrow strips are to be operated upon, screw 95 may be so adjusted as to restrict the lateral movement of the hook-shaped member 93 so that said hook-shaped member will not tend to feed more than one strip 105. When rod 61 reciprocates in the opposite direction, carriage 9 will be moved to the right, as viewed in Figs. 4 and 5a and in so moving the hook 93 will move the inner-most strip 105 longitudinally in a direction parallel to the movement of the carriage. In this manner a strip 105 is automatically brought to the operating zone.

As will be hereinafter more fully described, when the strip is thus fed to the operating zone, means is provided for properly aligning said strip in the operating zone and rigidly clamping the same therein. After this operation is performed, rod 61 will reciprocate in the opposite direction whereby the knives 47 will cut or plane the upper edge or surface of the strip 105 which is held in the operating zone. When the carriage 9 moves to the position shown in Fig. 5a and hook 93 is so disposed as to feed another strip into the operating zone, the member 100 will be brought to the position shown in Fig. 5a, that is, the hook 101 will have sprung behind the end of the strip which is then in the operating zone. It can readily be seen that when rod 61 reciprocates in the opposite direction to move carriage 9 to the right, hook 101 will act to remove the planed strip from the operating zone simultaneously with the action of hook 93, feeding a fresh strip to the operating zone.

As has been hereinbefore described, bevel gear 56 is carried at one end of shaft 55. At the opposite end of said shaft a cam 107 is mounted, said cam being substantially circular in shape but having a segment removed so as to provide a flat surface 108. A link 109 may be pivoted at its lower end as at 110 in frame 1 and may carry intermediate its length a follower 111 which is adapted to ride upon the surface of cam 107, said follower being maintained in contact with said surface by means of coil spring 112 secured by the link 109 and frame 1. The upper end of link 109 may project through an opening 113 in the top 5 and shoulder 106 may be provided with a recess 114 adjacent said opening in which the end of link 109 may be positioned when roller 111 is on the circular portion of cam 107. As has been hereinbefore described, when member 100 and hook 101 remove the strip 105 from the operating zone after the same has been planed or otherwise operated upon, said strip is carried longitudinally toward the left end of the machine until the end of said strip abuts the strip 115.

The timing of the machine is such that when the finished strip is thus discharged from the operating zone, follower 111 will be brought into contact with the flat surface 108 of cam 107. Coil spring 112 is then free to urge link 109 toward the left, as viewed in Fig. 9 thereby causing the end of said link to leave recess in shoulder 106. Inasmuch as the finished strip is discharged along shoulder 106, when link 109 is so moved, the upper end of said link moves the rear end of the discharged strip laterally in order to permit the next strip to be discharged from the operating zone.

Referring particularly to Figs. 6 and 8, 116, 117, 118, 119 and 120 indicate cams which are mounted upon shaft 55. As will be hereinafter more fully described, cams 116 and 120 are of similar contour and cams 117 and 119 are of similar contour. Cams 116, 117, 119 and 120 are utilized to actuate mechanism to properly align and temporarily hold the strip 105 in the operating zone. Cam 118 together with its accompanying mechanism, to be hereinafter more fully described, is adapted to actuate means to hold the strip 105 in the operating zone during the planing or cutting of said strip. The mechanisms associated with cams 116 and 117 is identical with the mechanisms associated with cams 120 and 119 and for clarity of description only one set of mechanisms will be described.

Figure 13:
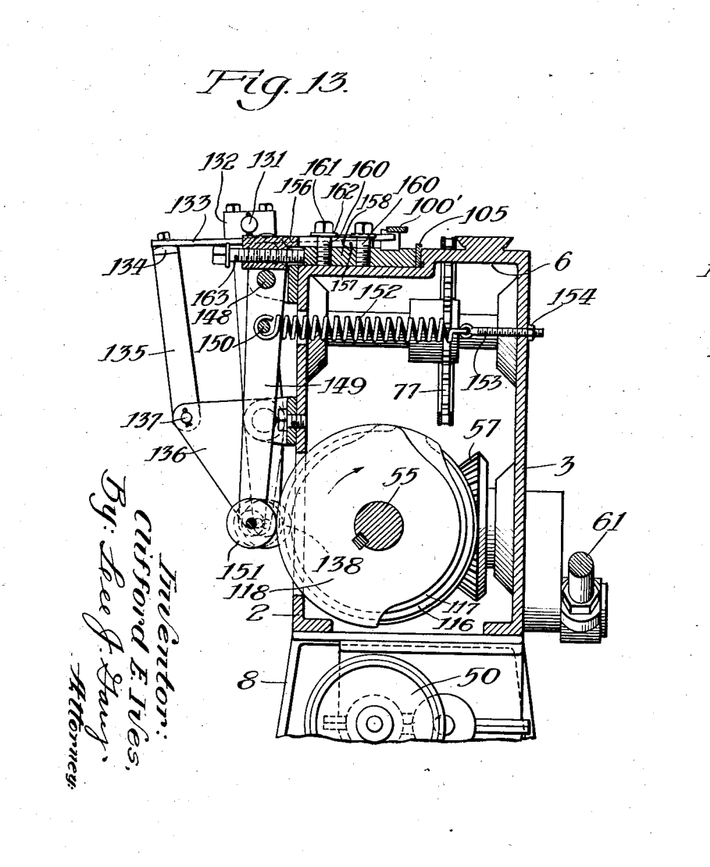
Fig. 13 is a sectional view taken on line 13—13 of Fig. 1.
Figure 14:
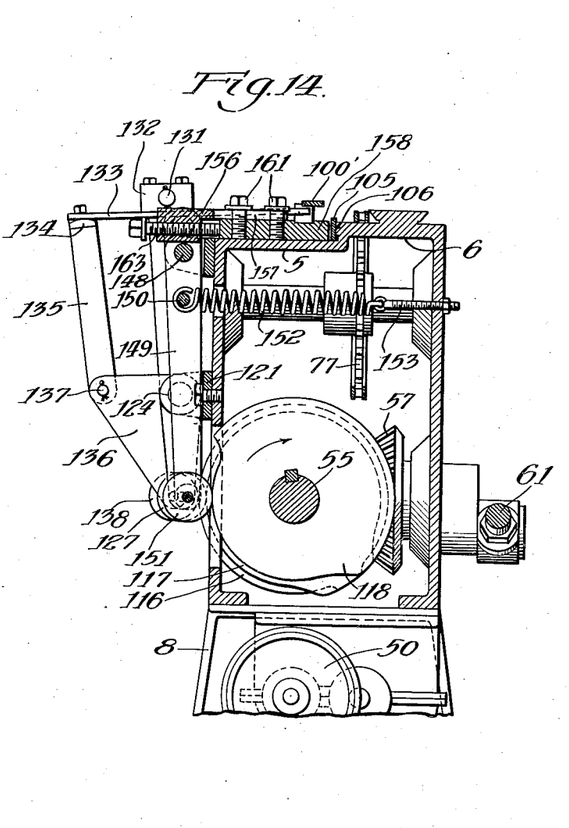
Fig. 14 is a similar view illustrating the clamping mechanism shown in Fig. 13 in a different position.

Referring particularly to Figs. 2, 3, 11 and 12, a bar 121 may be secured to the front side 2 of the frame 1 as by means of screws 122, said strip carrying lugs or bearings 123. It is to be understood, of course, that similar lugs or bearings 123 are also associated with cams 119, 120. A shaft 124 may be positioned within bearings 123 and an arm 125 may be rigidly secured to said shaft as by means of pin 126. Arm 125 may be bifurcated at its end and a follower roller 127 may be journalled between said arms. Roller 127 is adapted to contact the peripheral surface of cam 117 said contact being maintained by gravity or the weight of arm 125. A second arm 128 may be rigidly secured at its end to shaft 124, the opposite end of said arm being secured to a transverse bar 129 by means of bolt 130. The ends of bar 129 may comprise restricted cylindrical shafts 131 which may be journalled in oppositely disposed bearings 132 which, in turn, are carried at intermediate portions of fingers 133. Fingers are connected together by the transverse strap 134 which is bolted to the rear ends of said fingers. As shown best in Figs. 13 and 14, the upper surface of the transverse strap is arcuate in shape which permits a slight deflection of fingers 133. The central portion of strap 134 may be secured to the top of link 135 which extends downwardly from said strap. The lower end of link 135 is pivotally connected between parallel plates 136, said pivotal connection comprising pin 137. Plates 136 are of substantially triangular contour and are pivotally connected at one corner of the triangle so formed upon shaft 124. Pin 137 is positioned at an adjacent corner of the triangle and a roller 138 is journalled between said plates at the remaining corner of the triangle so formed, said roller being adapted to ride upon the surface of cam 116.

In operation when hook 93 carried by bar 89 engages the rear end of the innermost strip 105 upon the table top 4 and rod 61 moves in such a direction as to cause the carriage to move to the right as viewed in Fig. 4, the opposite end of said strip is inserted in the slot 139 provided by the shoulder 106 and a plate 140 mounted upon the surface of the top 4 by means of bolts 141. Bolts 141 pass through slots 142 in plate 140 whereby transverse movement of said plate may be obtained. After the innermost strip passes to the operating zone, the upraised portions 143 and 144 of cams 117 and 116 respectively move rollers 127 and 138 to the left as viewed in Figs. 11 and 12. By means of the linkage arrangements associated with each of said rollers, a compound movement is imparted to fingers 133. Link 135 tends to raise the rear ends of fingers 133. Simultaneously link 128 moves an intermediate portion of said fingers to the right and downwardly as viewed in Figs. 11 and 12. Since at this time the strip 105 is disposed adjacent shoulder 106, the free ends of fingers 133 contact the upper edge of said strip and force said strip downwardly and toward shoulder 106 thereby securely seating said strip. As will be hereinafter more fully described, while said strip is held by fingers 133 in this position, a locking means is applied to strip 105 so that the same may be maintained in rigid position while the carriage passes thereover.

A plate 145 may be mounted upon the central upper portion of the front side 2 of the frame 1, said plate being secured thereto by means of screws 146. Spaced apertured lugs or bearings 147 may be formed integral with plate 145 and a shaft 148 may be journalled in said lugs. Shaft 148 may carry a pair of spaced links 149, said links being carried intermediate their length whereby shaft 148 serves as a pivot about which said links may be rocked. Links 149 may be maintained in spaced relationship by means of tie rod 150 which secures said links together intermediate their length. A follower roller 151 may be journalled between the lower ends of links 149 and is adapted to ride upon the peripheral surface of cam 118, said roller being positively maintained in contact with said cam surface by means of coil spring 152 which may be anchored at one end to the adjusting screw 153 and at its opposite end to tie rod 150. The effective length and, hence, the tension of spring 152 may be varied by manipulating nut 154 which is engageable with screw 153.

The upper inner face of each of the links 149 may carry a conical projection 155, said conical projections being disposed opposite to each other. A block 156 may be positioned between the upper end of links 149 and may be provided with opposite indentations adapted to receive the apices of the conical projections 155. Block 156 may be substantially L-shaped in cross section as shown best in Figs. 13 and 14, and may be provided with a slot 157.

A vise-like plate or jaw 158 may be mounted upon the top 4 and is adapted to be transversely slidable upon said top, said plate being cooperatively associated with dove-tail guides 159.

One portion of the L-shaped block 156 is adapted to be positioned over the central part of plate 158 and locking screws 160 are adapted to pass through slot 157 and threadedly engage in plate 158. Screws 160 may have polygonal shaped heads 161 which terminate in integral washers 162 whereby contact is made between screws 160 and the upper portion of block 156. A set screw 163 may be threadedly positioned in block 156, the inner end of said screw being adapted to contact the edge of plate 158 whereby movement of said screw permits variable spacing between the edge of plate 158 and block 156. When the desired cooperative arrangement or spacing is obtained between block 156 and plate 158, screws 160 may be tightened to lock said block and plate as an integral unit.

In operation, as shaft 55 rotates, follower 151 rides upon the surface of cam 118. The surface of cam 118 is so designed that for a major portion of its periphery follower 151 is maintained to the left as viewed in Fig. 14. For the remaining portion of its periphery, follower 151 is permitted to move to the right. It can readily be seen that inasmuch as follower 151 is positively maintained in contact with the cam surface by means of spring 152, links 149 will be rocked about the pivot shaft 148 and plate 158 will thereby be moved transversely upon top 4. The timing of the machine is such that after a strip 105 has been introduced into the operating zone and fingers 133 have acted to properly align said strip adjacent shoulder 106, cam 118 will have so rotated as to bring the high surface of said cam into contact with follower 151. As is apparent, links 149 will be rocked in a clockwise direction as viewed in Figs. 13 and 14 thereby moving plate 158 inwardly toward strip 106. In this manner said strip is firmly clamped within the operating zone. After plate 158 has so clamped strip 105 in operative position, cams 116, 117, 119 and 120 act to permit fingers 133 to move away from the upper edge of strip 105. At this period rod 61 so moves to cause carriage 9 to pass over the strip clamped in the operating zone.

As has been hereinbefore described, a plate 140 is positioned upon the upper surface of top 4 adjacent the point of introduction of strips 105 to the operating zone. A similar plate 164 is positioned at the opposite end of plate 158, in other words, at the discharge end of the operating zone.

Figures 5, 19, 20, 21, 22:
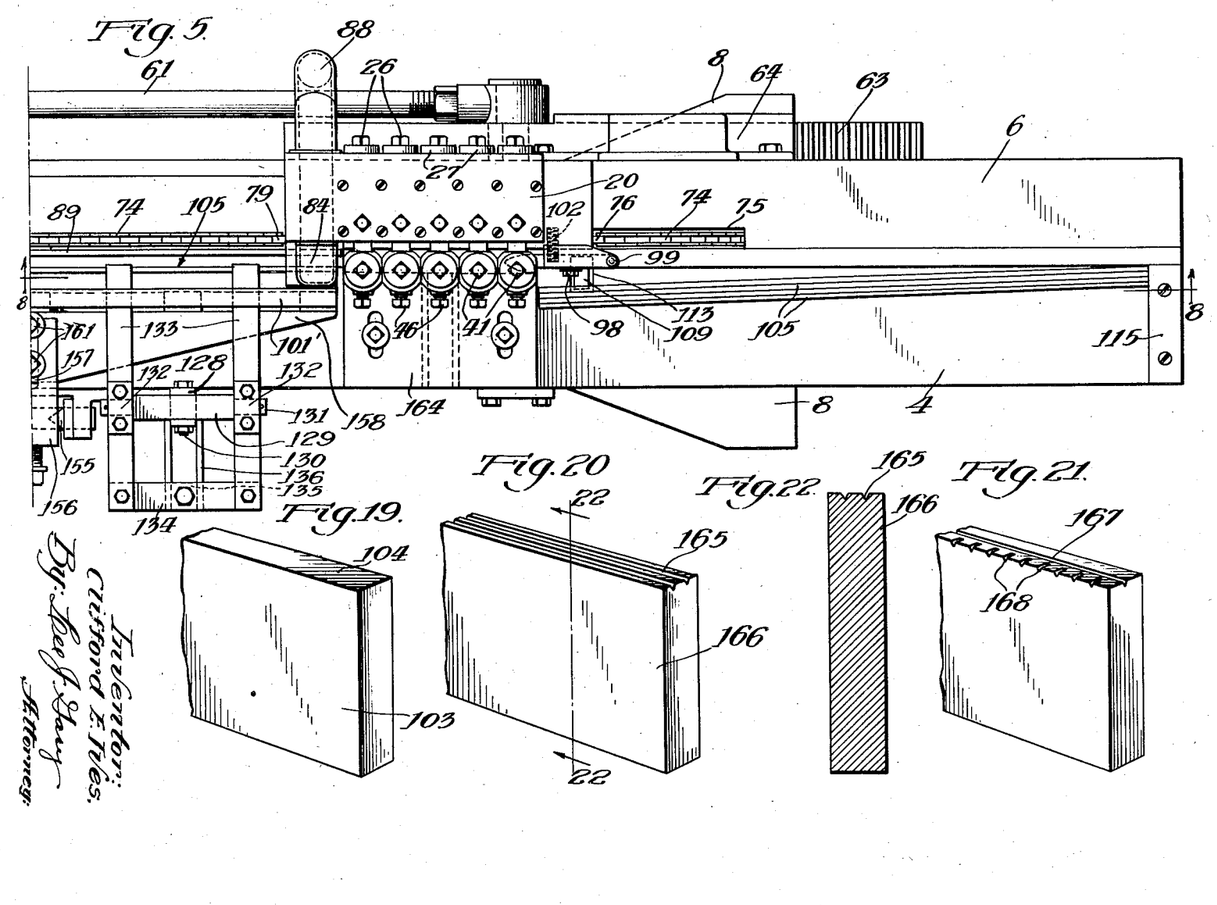
Fig. 5 is a continuation of Fig. 4.
Figs. 19, 20 and 21 are fragmentary perspective views of strips which may be planed or finished upon my machine.
Fig. 22 is a sectional view taken on line 22—22 of Fig. 20.
Figures 6, 7:
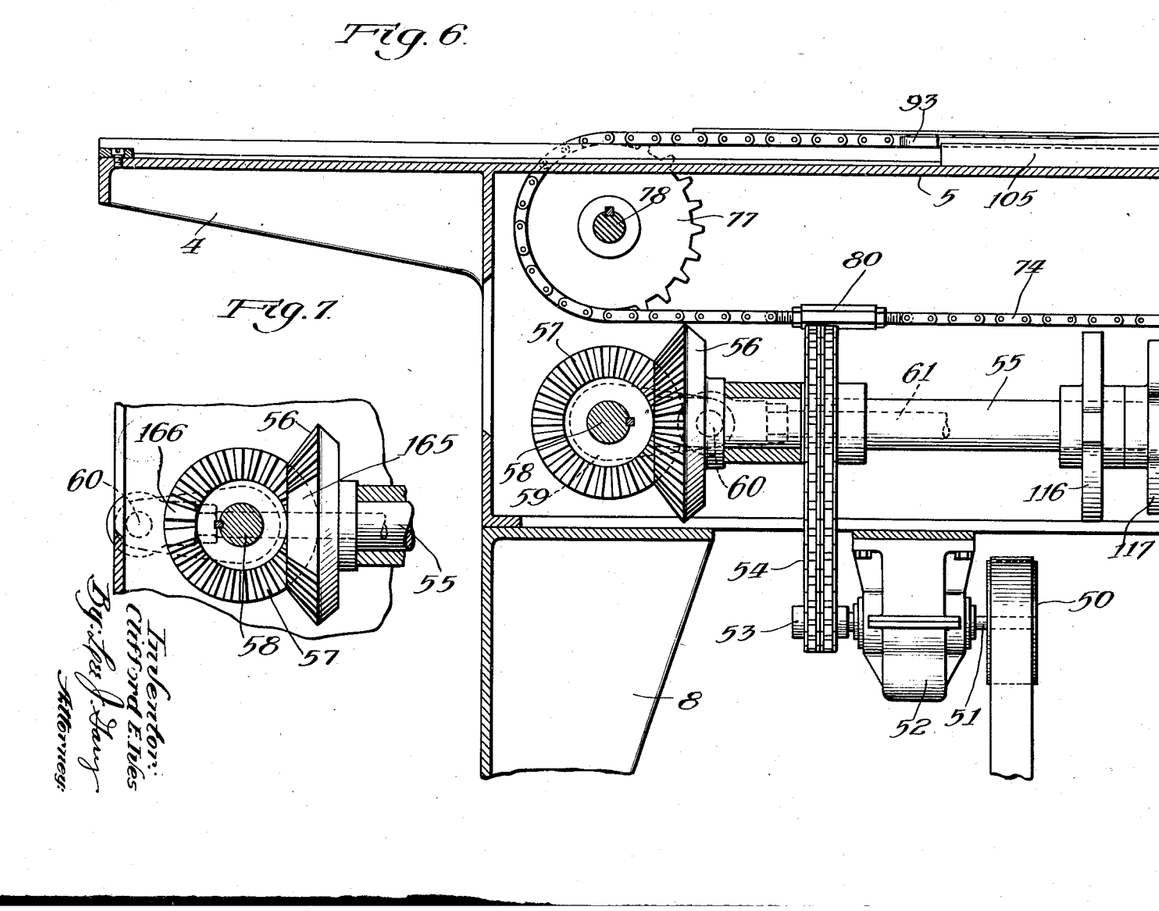
Fig. 6 is a sectional view taken on line 6—6 of Fig. 4.
Fig. 7 is a fragmentary detail view illustrating the bevelled drive gears wherein an intermittent motion is obtained.
Figure 8:
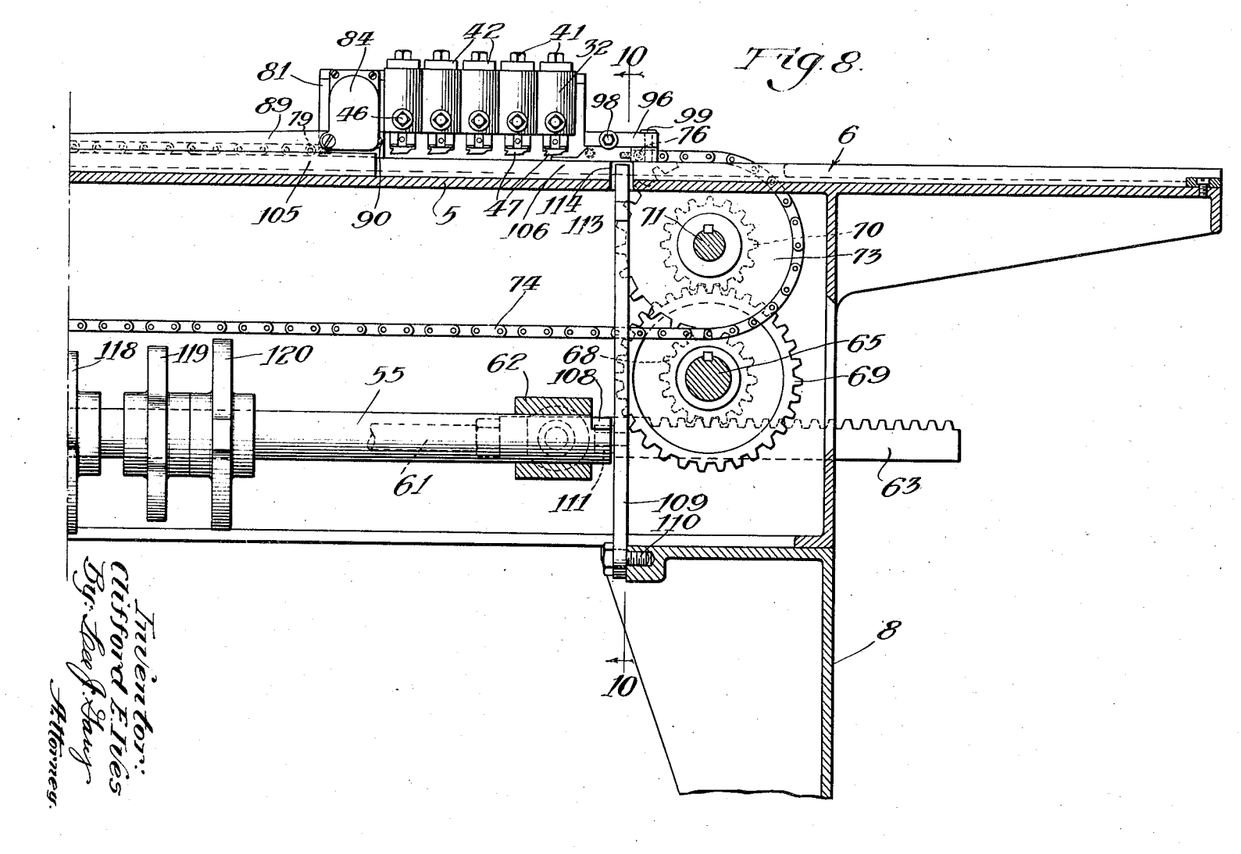
Fig. 8 is a sectional view taken on line 8—8 of Fig. 5 and is virtually a continuation of Fig. 6.

As has been hereinbefore pointed out, carriage 9 may be equipped with tools other than the usual planing knives in order to perform the desired operations upon the work within the operating zone. Referring particularly to Figs. 20 and 22, it will be seen that the knives capable of being carried by the carriage may be such as to cut grooves 165 in the upper edge of a strip 166. Of course, the contour of said grooves may be triangular as shown or may be semi-circular. In addition, if desired, one or more of the tool-holding units may be utilized. For instance, one of the tools may be adapted to cut a groove such as groove 167 shown in Fig. 21. Another of the tools may be adapted to provide a series of transverse indentations such as those shown at 168 in Fig. 21. In this latter case the tool would perform no cutting function whatsoever but would be of such design as to merely roll upon the upper surface of the strip. Another manner in which the tools in carriage 9 may be arranged is to provide a tool in the first tool holder which is capable of producing indentations similar to those shown at 168 and provide one or more of the remaining tool holders with a knife or knives to level or plane the intended surface to remove any inequalities of said surface which may be produced by the knurling or indenting tool.

Describing a complete operation of my machine, with a plurality of strips 105 properly disposed upon the feed-end of the machine and the motor 48 set in operation, rod 61 moves carriage 9 to the left as viewed in Fig. 1 until the point of hook 93 is positioned immediately behind the end of the innermost strip. At this period rod 61 reverses its direction and moves carriage 9 to the right. In so moving the carriage the innermost strip 105 is moved longitudinally and passed within slot 139 between plate 140 and shoulder 106. The movement of the strip is continued until said strip is positioned between shoulder 106 and the clamping plate 158. This zone is referred to herein as the operating zone and when strip 105 is positioned therein, carriage 9 will have reached its furthermost travel to the right. At this phase of the operation cams 116, 117 and 119 and 120 move to cause fingers 133 to temporarily clamp the strip in desired position within the operating zone and immediately thereafter cam 118 acts to move plate 158 transversely into contact with the side of the strip in the operating zone.

While the aligning and clamping operations are taking place, carriage 9 remains at its furthermost position at the right. This hesitation or temporary immovability of carriage 9 is brought about by the construction of gears 56 and 57. As can be readily seen in Figs. 6 and 7, gear 56 is a driving gear and the gear 57 is a driven gear. A portion 165 of the toothed face of gear 56 is constructed as a blank, in other words, the area 165 comprises a portion of the surface of a cone, said area being on the pitch circle of the gear 56. A portion of the toothed face of gear 57 is so constructed as to register with the blank portion 165 as indicated at 166, and the central portion of the area 166 is also on the pitched circle of gear 57. Consequently, although shaft 55 revolves continuously thereby revolving cams 116, 117, 118, 119 and 120 continuously, shaft 58 will move intermittently when the area 165 on gear 56 reaches the area 166 on gear 57. The timing of the mechanism is such that said areas will come into coincidence when carriage 9 is at its furthermost travel to the right and at this period cams 116, 117, 118, 119 and 120 operate to align and clamp the strip in the operating zone.

After gear 56 has so moved as to bring the first tooth adjacent the area 165 into contact with the first tooth adjacent the area 166 on gear 57, rod 61 will be so moved as to cause the carriage to travel toward the left as viewed in Fig. 1. When the carriage passes over the operating zone the tools mounted in said carriage operate upon the strip firmly clamped within the operating zone. When the cutting or indenting or knurling action is completed, carriage 9 will be in the position shown in Fig. 5a and as can readily be seen, hook 93 is in position to move a fresh strip into the operating zone and hook 101 is in position to remove the plane strip from the operating zone. However, prior to movement of the carriage from left to right, cam 118 will have revolved to the position which permits plate 158 to be retracted from its clamping position thereby releasing the strip 105 within the operating zone. When the strip has thus been removed from the operating zone, the flat face 108 of cam 107 has revolved to a position in contact with follower 111, thereby permitting lever 109 to rock which laterally moves the discharge strip away from the slot between plate 164 and shoulder 106.

It is frequently desirable in manufacturing strips for printing purposes, similar to strip 166, that the grooves 165 be wavy or irregular instead of straight as shown. To accomplish this object, a bar 100′ may be mounted adjacent the path of travel of the carriage 9, said bar being mounted upon blocks 101′. That edge of bar 100′ which faces the carriage although shown as being straight, may be of wavy or irregular contour, corresponding to the waves of the groove to be cut. By loosening set screws 30 and by proper adjustment of screws 25 the outer edges of the tool carriers may be brought to abutting relationship with respect to the wavy edge of bar 100′, said tool carriers being maintained in contact with the wavy edge of said bar under the influence of springs 29. It can readily be seen that as each tool carrier moves along said bar the knife 41 carried by said tool carrier will trace a path similar to the contour of the bar. Hence, by changing the contour of the contacting edge of the bar, substantially any desired contoured groove may be cut in the strip.

It may be desired to cut, groove or plane two or more strips simultaneously. With my device this may be conveniently done by adjusting hook member 93 to feed more than one strip at a time or the strips as placed on table 4 may be previously clamped together in units of two or more and may be fed to the operating zone while so clamped.

I claim as my invention:

1. A mechanism of the type described which comprises in combination, a frame, a carriage mounted for intermittent movement forwardly and backwardly over said frame, an operating zone on said frame adjacent the path of movement of said carriage, a tool mounted upon said carriage, automatic means associated in timed relationship with the movement of the carriage and secured to the leading end thereof for slidably feeding a strip to said operating zone, means carried by said frame for aligning said strip within said operating zone, means mounted upon said frame for thereafter clamping said aligned strip within said operating zone, said tool in being carried forwardly adjacent said operating zone being adapted to act upon the strip clamped in said zone while moving longitudinally thereof.

2. A mechanism of the type described which comprises in combination, a frame having a substantially horizontal bed, a carriage mounted for intermittent reciprocal longitudinal movement over said bed, an operating zone on said frame adjacent the path of movement of said carriage, a tool mounted upon said carriage, automatic means associated in timed relationship with the movement of the carriage for engaging and feeding a strip to said operating zone when said carriage moves backwardly over said frame, means carried by said frame for aligning said strip in said operating zone, separate means mounted upon said frame for clamping said aligned strip within said operating zone, said tool in being carried forwardly adjacent said operating zone being adapted to act upon the strip clamped in said zone.

3. A mechanism of the type described which comprises in combination, a frame, a carriage mounted for intermittent longitudinal movement forwardly and backwardly over said frame, an operating zone on said frame adjacent the path of movement of said carriage, a tool mounted upon said carriage, automatic means associated in timed relationship with the movement of the carriage for feeding a strip to said operating zone when said carriage moves backwardly over said frame, means carried by said frame for aligning said strip within said operating zone, cam actuated means mounted upon said frame for thereafter clamping said aligned strip within said operating zone, said tool in being carried forwardly adjacent said operating zone being adapted to act upon the strip clamped in said zone, and engaging means associated in timed relationship with said carriage for removing the strip acted upon from said operating zone simultaneously with the introduction of a fresh strip to said operating zone.

4. A mechanism of the type described which comprises in combination, a frame having a feed platform at one end, a discharge platform at the opposite end and an operating platform in the center, a carriage movable forwardly and backwardly over said operating platform, a tool carried by said carriage, an engaging arm carried by said carriage for feeding a strip from said feed platform to the operating platform upon backward movement of said carriage, and an engaging arm carried by said carriage for simultaneously moving a second strip from said operating platform to said discharge platform and means for laterally moving the discharged work on said discharge platform.

5. A mechanism of the type described which comprises in combination, a frame having a feed platform at one end, a discharge platform at the opposite end and an operating platform in the center, a carriage movable forwardly and backwardly over said operating platform, a tool carried by said carriage, means carried by said carriage for feeding a strip from said feed platform to the operating platform upon backward movement of said carriage, and separate means carried by said carriage for simultaneously moving a second strip from said operating platform to said discharge platform, and means for thereafter displacing said second strip laterally upon said discharge platform.

6. A mechanism of the type described which comprises in combination, a frame, a carriage mounted for intermittent movement forwardly and backwardly over said frame, an operating zone on said frame adjacent the path of movement of said carriage, a tool mounted upon said carriage, automatic means associated in timed relationship with the movement of the carriage for feeding a strip to said operating zone, cam operated means carried by said frame and terminating in fingers for vertically and laterally displacing and aligning said strip in said operating zone by a compound movement imparted thereto by said cam, means mounted upon said frame for clamping said aligned strip within said operating zone, said tool in being carried forwardly adjacent said operating zone being adapted to act upon the strip clamped in said zone.

7. A mechanism of the type described which comprises in combination, a frame, a carriage mounted for intermittent movement forwardly and backwardly over said frame, an operating zone on said frame adjacent the path of movement of said carriage, a tool mounted upon said carriage, automatic means associated in timed relationship with the movement of the carriage for feeding a strip to said operating zone, cam operated means terminating in fingers carried by said frame for aligning said strip in said operating zone, cam operated means mounted upon said frame for clamping said aligned strip within said operating zone, said tool in being carried forwardly adjacent said operating zone being adapted to act upon the strip clamped in said zone.

8. A strip planing machine comprising in combination, a frame, a carriage mounted for movement upon said frame, a planing tool mounted upon said carriage, an operating platform upon said frame over which said carriage passes, means for automatically feeding a strip to said operating platform, movable means for laterally aligning said strip on said platform, means for thereafter clamping said strip on said platform whereby said strip is planed when the carriage passes longitudinally thereover, means for automatically engaging and slidably removing the planed strip from the operating platform carried adjacent the trail end of said carriage, and means carried by said carriage for removing cuttings from said operating platform when the carriage moves thereon.

9. A mechanism of the type described which comprises in combination, a frame having a substantially horizontal bed, a carriage mounted for intermittent reciprocal movement longitudinally of and over said bed, an operating zone on said bed and extending laterally onto said bed adjacent the path of movement of said carriage, a tool mounted upon said carriage, automatic means associated in timed relationship with the movement of the carriage and secured to and extending therefrom for feeding a strip to said operating zone, means carried by said frame for aligning said strip in said operating zone by a compound movement imparted thereto, means mounted upon said frame for clamping said strip within said operating zone while the same is held therein by the aligning means, said tool in being carried forwardly adjacent said operating zone being adapted to act upon the strip clamped in said zone while being carried longitudinally thereof.

10. A mechanism of the type described which comprises in combination, a frame, a carriage mounted for intermittent movement forwardly and backwardly over said frame, an operating zone on said frame adjacent the path of movement of said carriage, a tool mounted upon said carriage, automatic means associated in timed relationship with the movement of the carriage for engaging and feeding a strip to said operating zone, means carried by said frame for aligning said strip in said operating zone, means mounted upon said frame for thereafter clamping said strip within said operating zone while the same is held therein by the aligning means, said aligning means being rendered inoperative after said clamping means has acted, said tool in being carried forwardly adjacent said operating zone being adapted to act upon the strip clamped in said zone.

11. A mechanism of the type described which comprises in combination, a frame having a substantially horizontal bed, a carriage mounted for intermittent reciprocal movement longitudinally thereof and extending over said frame, an operating zone on said bed adjacent the path of movement of said carriage, a tool mounted upon said carriage, and automatic cam actuated means associated in timed relationship with the movement of the carriage and extending laterally onto said bed for clamping a strip in said operating zone during forward movement of said carriage.

12. A mechanism of the type described which comprises in combination, a frame, a carriage mounted for intermittent movement forwardly and backwardly over said frame, an operating zone on said frame adjacent the path of movement of said carriage comprising a substantially horizontal continuous bed and lateral abutment adjacent thereto, a tool mounted upon said carriage, automatic means associated in timed relationship with the movement of the carriage for slidably feeding simultaneously one or more strips to said operating zone, movable means carried by said frame for vertically and laterally aligning said strips in said operating zone by a compound movement, means mounted upon said frame for thereafter clamping said strips within said operating zone, said tool being carried forwardly adjacent said operating zone being adapted to act upon the strip clamped in said zone while moving longitudinally thereof.

CLIFFORD E. IVES.